Patented May 20, 1941

2,242,883

UNITED STATES PATENT OFFICE 2,242,883

TREATMENT OF GELATIN

Donald P. Grettie, Chicago, Ill., assignor to Industrial Patents Corporation, Chicago, Ill., a corporation of Delaware No Drawing. Application August 24, 1938,
Serial No. 226,449

3 Claims. (Cl. 204—158)

This invention relates to a method of treating gelatin.

An important characteristic of gelatin is its viscosity.

An important characteristic of gelatin used in marshmallow formulas is the whipping quality.

One of the objects of this invention is to provide a method of treating gelatin to increase its viscosity.

Another object of this invention is to provide a method of treating gelatin to improve its whipping quality for its use in such products as marshmallow.

Other objects and purposes of the invention will be discussed in this specification.

This invention contemplates the irradiation of gelatin in a dry or semi-dry form with ultraviolet light. It is commonly known that irradiation of solutions of gelatin with ultraviolet light results in a decrease in the viscosity of the gelatin irradiated. I have discovered, however, that irradiation of dry or semi-dry gelatin with ultraviolet light, results in an increase in the viscosity of the gelatin.

Irradiation of gelatin does not affect the color or the clarity of the gelatin but develops in the gelatin a characteristic odor. This effect is independent of the temperature at which the gelatin is irradiated and is not due to a loss of moisture during the irradiation process. The increase in viscosity is greatest when gelatin in a dry powdered form is irradiated, apparently due to the increased surface exposed to the ultraviolet light.

The increase in viscosity of irradiated gelatin is proportional to the length of time of exposure of the gelatin to the ultraviolet light and on the intensity of the irradiation. The whipping quality of gelatin is improved by a short irradiation, but a longer irradiation period causes a reversal of this effect and the whipping qualities decrease. The irradiation appears to have no appreciable effect upon the jelly strength of the gelatin.

The effect of irradiation of gelatin for varying periods of time and different intensities on the important constants of gelatin is set forth in the following table:

| Sample | Jelly strength in grams | Viscosity in millipoises | pH | Weight in pounds per gallon of marshmallow whip after the following time intervals | |
|---|---|---|---|---|---|
| | | | | 8 min. | 12 min. |
| Blend of acid cured and alkali cured gelatin | 219 | 52 | 4.6 | 3.04 | 2.95 |
| Same exposed to ultraviolet light 2 hours at 18 inches | | | | 2.93 | 2.89 |
| Same exposed to ultraviolet light 4 hours at 18 inches | 223 | 56 | | 2.95 | 2.95 |
| Same exposed to ultraviolet light 4 hours at 10 inches | 220 | 69 | 4.5 | 3.22 | 3.04 |
| Acid cured gelatin, pH not adjusted | 239 | 41 | 4.2 | 3.18 | 2.82 |
| Same exposed to ultraviolet light 4 hours at 10 inches | 234 | 44 | 4.2 | 2.94 | 2.74 |
| Acid cured gelatin, pH adjusted | 216 | 38 | 4.35 | 3.39 | 2.96 |
| Same exposed to ultraviolet light 4 hours at 10 inches | 217 | 40 | 4.38 | 3.17 | 2.89 |

It is apparent from the table that the jelly strength is not appreciably affected by the irradiation, regardless of the period or of the intensity of the irradiation. The increase in viscosity is dependent upon the period and upon the intensity of the irradiation. An increase in the period of irradiation or an increase in the intensity of the irradiation causes an increase in the viscosity. The whipping qualities of the gelatin are increased by a short period of irradiation and decrease with a prolonged period of irradiation.

The optimum period and intensity of the irradiation depends upon the initial properties of the gelatin. This is readily apparent from the foregoing table which indicates that a two hour irradiation at eighteen inches of a blend of acid cured and alkali cured gelatin having a viscosity of 52 millipoises and a pH of 4.6, when used in a marshmallow formula, produced a whipped marshmallow having a weight of 2.89 pounds per gallon after a whipping period of twelve minutes, while a four hour irradiation at ten inches of an acid cured gelatin having a viscosity of 38 millipoises and whose pH had been adjusted to 4.35, when used in a marshmallow formula, produced a whipped marshmallow having the same weight per gallon after a twelve minute whipping period.

The term "dry gelatin" is used in the specification and claims to include gelatin containing up to about 15 per cent moisture.

I claim:

1. A process for improving the whipping qualities of gelatin which comprises subjecting dried gelatin to the action of artificially produced ultraviolet rays for a period of time sufficient to effect an improvement in the whipping qualities of the gelatin when the treated gelatin is dissolved in water but said action of the ultraviolet rays being so limited as to avoid subsequent substantial injury to the whipping qualities.

2. A process for the treatment of gelatin to improve the viscosity and whipping qualities which comprises subjecting the gelatin in dry form to the action of artificially produced ultraviolet rays for a period of time sufficient to effect an increase in the viscosity and an improvement in the whipping qualities of solutions of the treated gelatin but said action of the ultraviolet rays being so limited as to avoid subsequent substantial injury to the whipping qualities.

3. A process substantially as set forth in claim 1 applied to dry gelatin in the form of a powder.

DONALD P. GRETTIE.